United States Patent
Morgan et al.

(10) Patent No.: US 7,722,699 B2
(45) Date of Patent: May 25, 2010

(54) ADAPTABLE DUAL-DIRECTIONAL, DIFFERENTIAL PRESSURE ASSEMBLY

(75) Inventors: Lee Pendleton Morgan, Jonesboro, AR (US); Jan Eric Larson, Trosa (SE)

(73) Assignee: Camfil Farr, Inc., Jonesboro, AZ (US)

( * ) Notice: Subject to any disclaimer, the term of this patent is extended or adjusted under 35 U.S.C. 154(b) by 0 days.

(21) Appl. No.: 12/325,121

(22) Filed: Nov. 28, 2008

(65) Prior Publication Data

US 2009/0078116 A1 Mar. 26, 2009

Related U.S. Application Data

(62) Division of application No. 10/875,757, filed on Jun. 24, 2004.

(60) Provisional application No. 60/482,241, filed on Jun. 26, 2003.

(51) Int. Cl.
*B01D 46/04* (2006.01)
*B01D 46/52* (2006.01)

(52) U.S. Cl. .............. 95/20; 95/26; 95/280; 96/421; 96/428; 55/283; 55/302; 55/498; 55/521; 55/524

(58) Field of Classification Search .......... 95/22, 95/19, 280, 20, 26; 96/402, 421, 428; 55/283, 55/302, 502, 521, 524, 498
See application file for complete search history.

(56) References Cited

U.S. PATENT DOCUMENTS

| | | | | |
|---|---|---|---|---|
| 2,347,351 A * | 4/1944 | Laing | ............... | 137/625.36 |
| 3,756,416 A * | 9/1973 | Wood | ............... | 210/408 |
| 4,443,235 A * | 4/1984 | Brenholt et al. | ............... | 96/408 |
| 4,655,799 A * | 4/1987 | Bosworth et al. | ............... | 96/427 |
| 4,786,293 A * | 11/1988 | Labadie | ............... | 95/20 |
| 5,071,555 A | 12/1991 | Enbom | | |
| 5,116,395 A * | 5/1992 | Williams | ............... | 96/426 |
| 5,512,086 A * | 4/1996 | Glucksman | ............... | 96/68 |
| 5,584,900 A * | 12/1996 | Zaiser et al. | ............... | 55/293 |
| 5,616,171 A * | 4/1997 | Barris et al. | ............... | 95/280 |
| 5,750,024 A | 5/1998 | Spearman | | |
| 5,972,059 A | 10/1999 | Morgan | | |
| 6,073,905 A * | 6/2000 | Wilson | ............... | 251/61 |

(Continued)

*Primary Examiner*—Duane Smith
*Assistant Examiner*—Ives Wu
(74) *Attorney, Agent, or Firm*—Law Office of Robert E. Kasody, P.C.

(57) ABSTRACT

An adaptable dual direction, differential pressure assembly is disclosed. Solenoid valves release controlled bursts of air into a top of a container. A rate of the controlled bursts of air is partially responsive to a pressure differential between atmospheric pressure and that of compressed air in the reservoir. A pleated filter is fitted inside of the container. The pleated filter has an inner wall and an outer wall and has pleatings separated using hot melt glue beads there between. The controlled bursts of air are programmed to be substantially automatically responsive to one or more pressure differentials between an inner wall and an outer wall. In one embodiment, air is drawn from the blower through the pleated filter from the inner wall to the outer wall until a desired pressure differential is achieved. In yet another embodiment, air is drawn through the pleated filter from the outer wall into the inner wall and to draw upwardly out of the top of the container through the blower until a first pressure differential is achieved.

16 Claims, 3 Drawing Sheets

U.S. PATENT DOCUMENTS

| | | |
|---|---|---|
| 6,197,079 B1 | 3/2001 | Mori et al. |
| 6,261,979 B1 | 7/2001 | Tanaka et al. |
| 6,416,562 B1 | 7/2002 | Shibuya et al. |
| 2007/0186774 A1* | 8/2007 | Gillingham et al. ........... 95/280 |

* cited by examiner

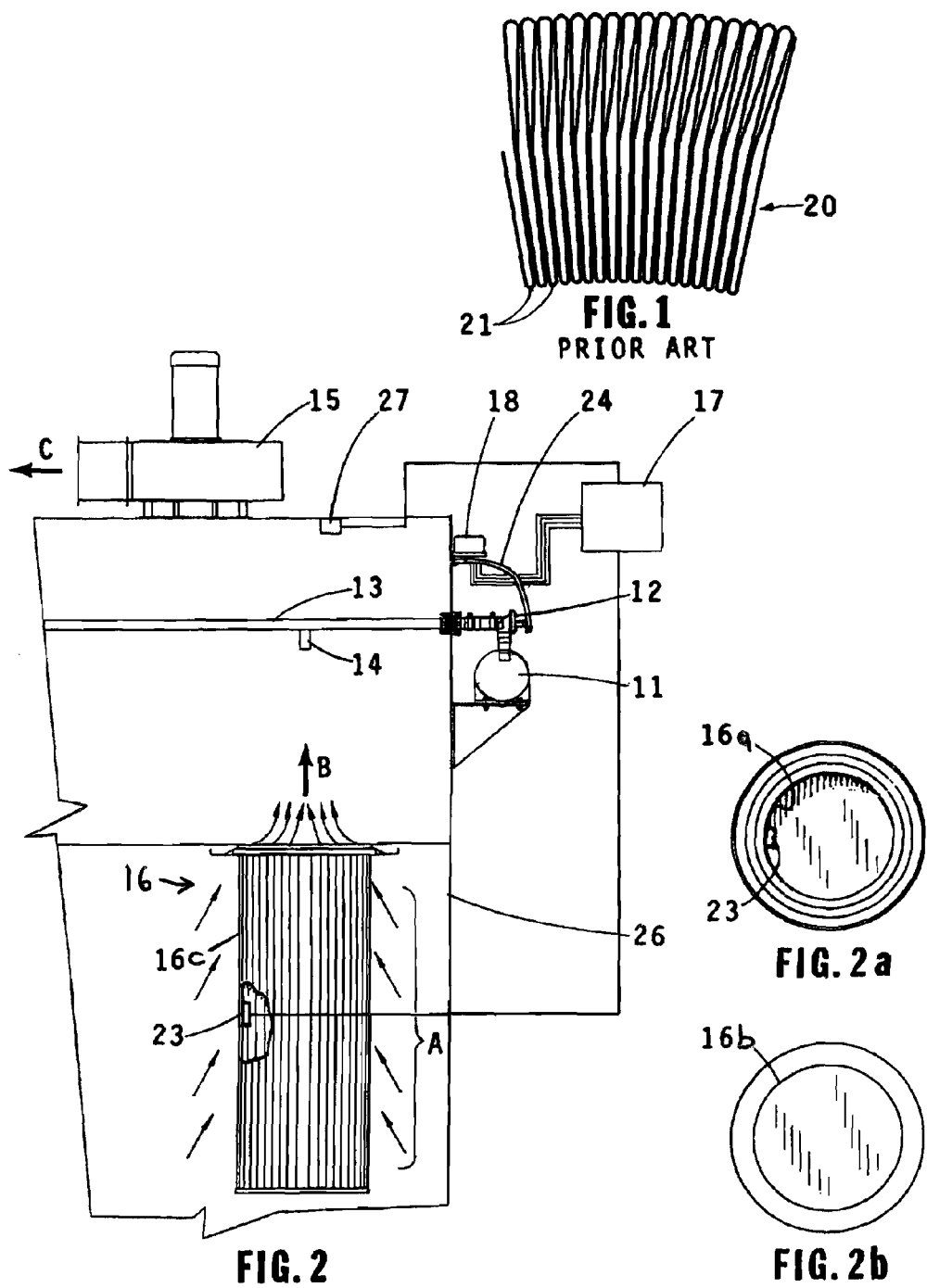

US 7,722,699 B2

ADAPTABLE DUAL-DIRECTIONAL, DIFFERENTIAL PRESSURE ASSEMBLY

This application is a divisional application that claims priority to U.S. Utility application Ser. No. 10/875,757 filed on Jun. 24, 2004, entitled "PLEATED AIR FILTER WITH REVERSE PULSATING AIR FLOW CLEANING"; which U.S. Utility application claims priority to U.S. Provisional Application Ser. No. 60/482,241 that was filed on Jun. 26, 2003. Applicant claims the benefit of 35 U.S.C. section 120 with respect to the above mentioned foregoing applications.

BACKGROUND OF THE INVENTION

1. Field of the Invention

This invention relates to a pleated cartridge air filter in which the pleats are separated from each other by means of beads and which includes a reverse pulse cleaner for automatically cleaning the cartridge.

2. Description of the Related Art

Air filter units have been developed in the prior art, such as described in U.S. Pat. No. 5,512,086 issued Apr. 30, 1996 to Glucksman, which employ pleated filter elements. The use of pleats has a distinct advantage in that it affords considerably greater filtering area. It has been found, however, that the pleats tend to bend together towards each other and thus lose their effectiveness. To obviate this problem, separator elements have been employed to keep the pleated elements separated from each other. As mentioned in Glucksman, this can take the form of a glue or other such material placed between the pleats which when it hardens forms separating beads. Such a device is described in U.S. Pat. No. 5,071,555 issued on Dec. 10, 1991 to Enbom. It is to be noted that in Enbom, the filter is linear and not in the form of a container such as a cylinder. It is to be noted that in Glucksman, the cartridge is the form of a half sphere and is not in the form of a container having continuous side walls.

A problem which prior art devices have is the necessity to rather frequently replace the filter cartridges particularly where the surrounding air has considerable dirt to be filtered out. This not only involves the costs involved in installing new filters but also the possibility of not replacing the filter in time which results in dirty air being fed to the area where clean air is required. The device of the present invention solves this problem by providing automatic cleaning of the filter in response to a measurement indicating that the filter is overfilled with dirt.

SUMMARY OF THE INVENTION

The device of the invention employs a filter cartridge in the form of a container having a closed bottom, an open top and sides which run completely therearound, which may be cylindrical in shape. The sides of the container are formed from a pleated paper material which may be of a polyester, cellulose, or polyester/cellulose blend material. The pleats are kept separated from each other by glue beads which are installed with melted glue which subsequently hardens. Filtering action is achieved by means of a blower which draws air upwardly out of the cartridge and in so doing draws air from the outside of the cartridge through the pleated filter element. Dirt is removed by the filter element from the air and the clean air is fed to the area where such clean air is required.

The filter is automatically cleaned as controlled by a timer in response to a pressure differential measurement indicating that the filter has over accumulated dirt and its effectiveness has substantially decreased. When a signal is received by the timer, showing a predetermined overly high pressure differential between the atmosphere and the interior of the filter, which indicates a high dirt accumulation, compressed air is fed in pulses at a predetermined pulsing rate from an air compressor into the interior of the cartridge. As controlled in response to the timer this pulsating air flow drives the dirt from the outer walls of the cartridge. When the filter is adequately cleaned, as indicated by a decrease in the pressure differential between the inside and outside of the filter, the cleaning action is terminated.

It is therefore an object of this invention to provide automatic cleaning of an air filter employing pleated filter elements;

It is a further object of this invention to assure optimum filtering action of an air filter by maintaining the filter's pleated elements in optimum filtering condition;

Other objects of the invention will become apparent in view of the following description taken in connection with the accompanying drawings

DESCRIPTION OF THE DRAWINGS

FIG. 1 is drawing of a prior art filter in which the pleated elements are not separated;

FIG. 2 is a schematic illustration showing the operation of the filter unit of the device of the invention;

FIG. 2A is a top plan view of the filter cartridge of FIG. 2;

FIG. 2B is bottom plan view of the filter cartridge of FIG. 2;

DETAILED DESCRIPTION OF THE INVENTION

Figure 3:
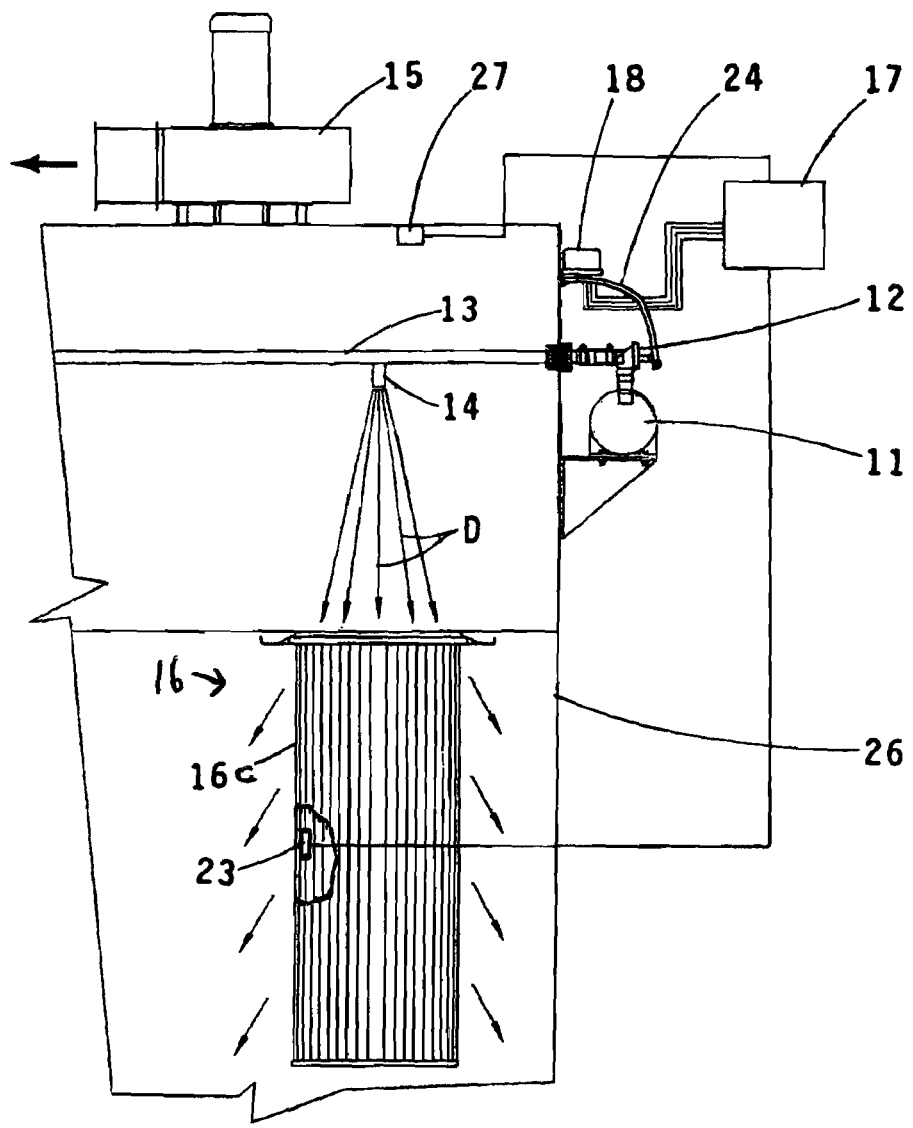
FIG. 3 is a schematic illustration showing the reverse pulse cleaning operation of the device of the invention.

Referring to FIG. 3, a pleated filter cartridge 20 of the prior art in which the pleats 21 have not been separated from each other is illustrated. Without such separation, adjoining pleats come together and the substantially greater surface area achieved with the pleats separated is not attained.

Figure 4:
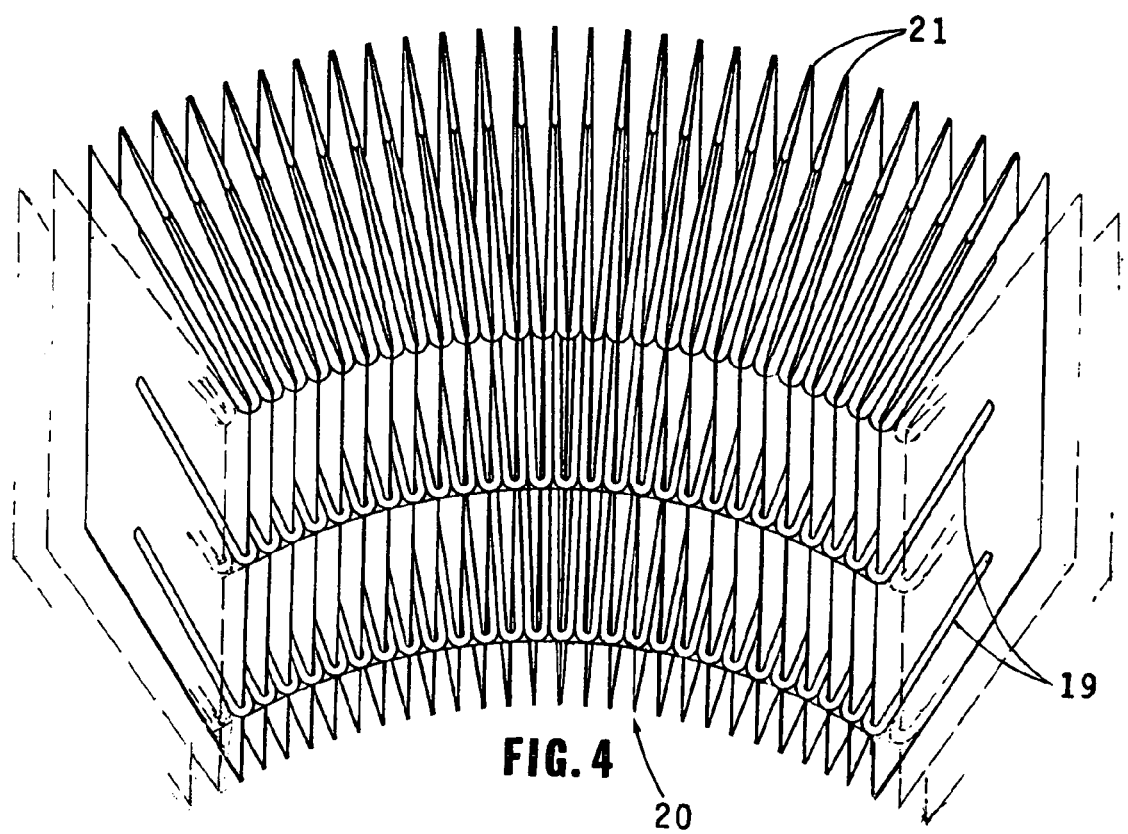
FIG. 4 is a cutaway section showing the pleated cartridge of the device of the invention.

Referring now to FIG. 4, the pleats 21 in the cartridge 20 of the present invention are illustrated. The pleats 21 are separated from each other by hot melt glue beads 19. In forming the pleated cartridge, the paper media is formed into a strip drawn through rolls which crease the media to prepare it to be folded into pleats 21. Before the strip is folded, the hot melt glue beads 19 are applied to one side of the strip in a manner so that they do not go all the way down in the pleat and only fill about ¾ of the depth of the pleat from the inside out. This way the outer tips of the pleats can fold into crisp tips. The beads run along the length of the strip and are spaced about one inch apart. The strip is then folded to form the pleated configuration with the hot melt beads adhering to each other back to back and finally cooling and hardening. The pleated strip is thus formed with the pleat sections separated from each other. The strip can then be wound into a cylindrical or other desired form.

Referring now to FIG. 2, the filtering operation of the device of the invention is illustrated. The filtering units are contained within housing 26. The filter cartridge 16 is cylindrical in form and has an open top 16a a closed bottom 16b and a side wall 16c in the form of a container. While in the preferred embodiment, the cartridge is cylindrical in form, it can take other shapes as long as the side wall 16c is continuous running all the way around the central cavity formed within the wall As shown in FIG. 4, the surface of the side wall 16c has pleats 21 formed thereon.

Air is drawn by blower 15 into the interior of the filter cartridge 16 through the pleated outside surface thereof as indicated by arrow "A" and drawn upwardly out of the cartridge as indicated by arrow "B." Any dust in the air is trapped in the outside walls of the filter. The airflow is generated by blower 15, and the filtered air flows out from the blower to the area where it is required, as indicated by arrow "C."

Referring now to FIG. 3, the automatic reverse pulse cleaning of the filter is illustrated. The filter cartridge 16 is contained within housing 26. Compressed air is stored in reservoir 11. A diaphragm valve 12 is connected to the output of the reservoir and when actuated by solenoid valves 18 feeds the stored compressed air into a blow pipe 13 that has a nozzle 14 positioned directly above the filter cartridge 16. The compressed air exits the nozzle at near sonic speed and is fed in short pulses or bursts in the nature of shock waves into the interior of the filter cartridge, as indicated by arrows "D.".

An automatic timer 17 is connected to solenoid valves 18 to control both the initiation and termination of the feeding of the bursts of air and the rate at which such bursts occur. The valves 18 have an air output which is fed in tube 24 to diaphragm valve 12. When the solenoid is actuated in response to the timer control, air is fed through tube 24 from the solenoid valves, at about atmospheric pressure, to the diaphragm valve and opens the valve by virtue of the pressure differential with the compressed air in the reservoir. The timer is programmed to set the rate of the pulsations of the compressed gas, which typically is between two and twelve pulses per minute. The timer is set to respond to a predetermined high pressure differential between the inner and outer walls of the filter indicating that the filter requires cleaning. The differential pressure across the filter is measured by timer control 17 which receives pressure measurements from pressure sensor 23 which measures the pressure within the filter cartridge and pressure sensor 27 which measures the pressure on the outside of the cartridge. When the differential pressure across the filter reaches the "high" point set into the timer control, the control will actuate the solenoid valves to begin a cleaning sequence until a "low" differential point set in the timer control is reached. The timer control then will end the cleaning cycle until the high set point is again reached and the cleaning cycle will again be initiated. In this manner, the filter is automatically kept clean.

While the invention has been described and illustrated in detail, this is intended by way of illustration and example only and is not to be taken by way of limitation, the scope of the invention being limited by the terms of the following claims.

We claim:

1. A dual-directional, pressure differential apparatus comprising:
    a container;
    a reservoir;
    at least two solenoid valves to release controlled bursts of air into a top of the container; wherein a rate of the controlled bursts of air are at least partially responsive to a pressure differential between atmospheric pressure and that of compressed air in the reservoir;
    a pleated filter fitted inside of the container, the pleated filter having an inner wall and an outer wall and outer tips;
    hot melt glue beads separate pleatings within the pleated filter; wherein the hot glue beads fill approximately three-fourths of a depth of a pleat from the inner wall to the outer wall to provide increased surface area; and
    a blower;
    wherein the controlled bursts of air are programmed to be substantially automatically responsive to a first pressure differential between the inner wall and the outer wall to draw air through the pleated filter from the inner wall to the outer wall until a second pressure differential is achieved; and
    wherein the controlled bursts of air are programmed to be substantially automatically responsive to a second pressure differential between the inner wall and the outer wall to draw air through the pleated filter from the outer wall into the inner wall and to draw upwardly out of the top of the container until a first pressure differential is achieved.

2. The apparatus of claim 1, wherein the first pressure differential comprises a high pressure differential point set that indicates the pleated filter requires cleaning; wherein the high pressure differential point is measured by a timer control that receives pressure measurements from first pressure sensor that measures pressure within the container and a second pressure sensor that measures pressure on an outside of the container.

3. The apparatus of claim 1, further comprising a timer control, a first pressure sensor, and a second pressure sensor; wherein the pressure differential is measured by the timer control that receives pressure measurements from the first pressure sensor that measures pressure within the container and the second pressure sensor that measures pressure on an outside of the container; wherein an automatic timer connected to the at least two solenoid valves controls initiation and termination of feeding of the bursts of air and the rate at such burst occurs; wherein the second pressure differential comprises a low pressure differential point set.

4. The apparatus of claim 1, further comprising a diaphragm valve; wherein the at least two solenoid valves are actuated in response to a timer control and the air feeds through a tube from the at least two solenoid valves at the atmospheric pressure to the diaphragm valve and opens the valve by virtue of the pressure differential between the atmospheric pressure with the compressed air in the reservoir; further comprising a timer control, a first pressure sensor, and a second pressure sensor; wherein the pressure differential is measured by the timer control that receives pressure measurements from the first pressure sensor that measures pressure within the container and the second pressure sensor that measures pressure on an outside of the container; wherein an automatic timer connected to the at least two solenoid valves controls initiation and termination of feeding of the bursts of air and a rate at such burst occurs.

5. The apparatus of claim 3, wherein the controlled bursts of air exits from nozzles at near sonic speed and is fed in short pulses or bursts to form shock waves into the inner wall; and wherein the outer tips fold into crisp tips.

6. The apparatus of claim 1, wherein the outer tips fold into crisp tips.

7. A dual-directional air burst assembly comprising:
    at least one nozzle;
    at least one blower;
    at least one solenoid valve to release controlled bursts of air at a rate at least partially responsive to a pressure differential between atmospheric pressure and that of compressed air in the reservoir;
    a pleated filter having an inner wall and an outer wall; wherein the pressure differential across the pleated filter is measured by a timer control which receives pressure measurements from a first pressure sensor which measures pressure within the pleated filter and a second pressure sensor which measures pressure on an outside of the pleated filter;

hot melt glue beads to separate individual pleatings in the pleated filter at a distance approximately three-fourths of a depth of the individual pleatings as measured from the inner wall to the outer wall and provide crisp tips on outer tips of the separate individual pleatings in the pleated filter;

wherein programmed bursts of air are at least partially responsive to a measured range between a first pressure differential and a second pressure differential, the first pressure differential and the second pressure differential measured as a relative pressure between the inner wall and the outer wall;

wherein upon a first pressure differential measurement, the air is drawn through the pleated filter from the inner wall to the outer wall until a second pressure differential is achieved; and once the second pressure differential is achieved, the air is drawn through the pleated filter from the outer wall into the inner wall and to draw upwardly out of the top of the container until a first pressure differential is achieved.

8. The assembly of claim 7, wherein the first pressure differential comprises a high pressure differential point set and the outer tips fold to form the crisp tips.

9. The assembly of claim 7, wherein the second pressure differential comprises a low pressure differential point set; and wherein the pleated filter comprises strips drawn through rolls and folded to form a pleated configuration.

10. The assembly of claim 7, further comprising a diaphragm valve; wherein the at least two solenoid valves are actuated in response to a timer control and the air feeds through a tube from the at least one solenoid valve at the atmospheric pressure to the diaphragm valve and opens the valve by virtue of the pressure differential between the atmospheric pressure and that of the compressed air in the reservoir; and wherein the pleated filter comprises strips folded to form a pleated configuration with the hot glue beads adhered to each other back to back.

11. The assembly of claim 7, wherein the programmed bursts of air exit from nozzles at near sonic speed and feds in short pulses or bursts to form shock waves into the inner wall; and wherein the pleated filter comprises strips that are folded to form a pleated configuration with the hot melt glue beads adhered to each other back to back, cooled hardened, and wound into a cylindrical form.

12. A method for automatic control of a dual-directional, differential pressure sensitive apparatus comprising:

releasing controlled bursts of air from at least two solenoid valves into a top of the container having a circular pleated filter having an inner wall and an outer wall;

wherein the pleated filter comprises hot melt glue beads applied to separate individual pleatings in the pleated filter approximately three-fourths of a depth of the individual pleatings as measured from the inner wall to the outer wall;

controlling a rate of the controlled bursts of air are at least partially responsive to a delta value, the delta value comprising a difference between substantially atmospheric pressure and that of compressed air in a reservoir;

measuring by a timer control which receives pressure measurements from a first pressure sensor which measures pressure within the pleated filter and the second pressure sensor which measures pressure on an outside of the circular pleated filter;

providing the controlled bursts of air at least partially automatically responsive to a first pressure differential between the inner wall and the outer wall to draw air through the pleated filter from the inner wall to the outer wall until a second pressure differential is achieved; and providing the controlled bursts of air at least partially automatically responsive to a second pressure differential between the inner wall and the outer wall to draw air through the pleated filter from the outer wall into the inner wall and to draw upwardly out of the top of the container until a first pressure differential is achieved.

13. The apparatus of claim 12, wherein the first pressure differential comprises a high pressure differential point set; and wherein the pleated filter comprises strips folded to form a pleated configuration with the hot melt glue beads adhered to each other back to back after cooled, hardened, and wound into a cylindrical form.

14. The apparatus of claim 12, wherein the second pressure differential comprises a low pressure differential point set; and wherein the pleated filter comprises strips folded to form a pleated configuration with the hot melt glue beads adhered to each other back to back after cooled, hardened, and wound into a cylindrical format.

15. The apparatus of claim 12, further providing a diaphragm valve; wherein the at least two solenoid valves are actuated in response to a timer control and the air feeds through a tube from at least one of the at least two solenoid valves at the substantially atmospheric pressure to the diaphragm valve and opens valve by virtue of the delta value.

16. The apparatus of claim 12, wherein the controlled bursts of air exit from nozzles at near sonic speed and are fed in short pulses or bursts as shock waves into the inner wall; and wherein the pleated filter comprises strips folded to form a pleated configuration with the hot glue beads adhered to each other back to back after cooled, hardened, and wound into a cylindrical format.

* * * * *